United States Patent
Xing et al.

(10) Patent No.: US 10,439,768 B2
(45) Date of Patent: Oct. 8, 2019

(54) PARALLEL MULTIUSER DATA TRANSMISSION METHOD AND PRIMARY NODE

(71) Applicant: ZTE CORPORATION, Shenzhen, Guangdong Province (CN)

(72) Inventors: Weimin Xing, Shenzhen (CN); Kaiying Lv, Shenzhen (CN); Kaibo Tian, Shenzhen (CN)

(73) Assignee: ZTE CORPORATION (CN)

( * ) Notice: Subject to any disclaimer, the term of this patent is extended or adjusted under 35 U.S.C. 154(b) by 298 days.

(21) Appl. No.: 15/510,220

(22) PCT Filed: Mar. 30, 2015

(86) PCT No.: PCT/CN2015/075410
§ 371 (c)(1),
(2) Date: Jul. 11, 2017

(87) PCT Pub. No.: WO2016/037481
PCT Pub. Date: Mar. 17, 2016

(65) Prior Publication Data
US 2017/0366307 A1    Dec. 21, 2017

(30) Foreign Application Priority Data
Sep. 12, 2014  (CN) .......................... 2014 1 0466218

(51) Int. Cl.
| | | |
|---|---|---|
| *H04L 1/18* | (2006.01) | |
| *H04W 76/15* | (2018.01) | |
| *H04B 7/0452* | (2017.01) | |
| *H04W 84/12* | (2009.01) | |
| *H04L 1/16* | (2006.01) | |
| *H04W 72/04* | (2009.01) | |
| *H04L 1/00* | (2006.01) | |

(52) U.S. Cl.
CPC ......... *H04L 1/1887* (2013.01); *H04B 7/0452* (2013.01); *H04L 1/1614* (2013.01); *H04L 1/1896* (2013.01); *H04W 72/0446* (2013.01); *H04W 76/15* (2018.02); *H04W 84/12* (2013.01); *H04L 2001/0093* (2013.01)

(58) Field of Classification Search
None
See application file for complete search history.

(56) References Cited

U.S. PATENT DOCUMENTS

| | | |
|---|---|---|
| 2011/0090855 A1 | 4/2011 | Kim |
| 2011/0268094 A1 | 11/2011 | Gong et al. |

(Continued)

FOREIGN PATENT DOCUMENTS

| | | |
|---|---|---|
| CN | 102158320 A | 8/2011 |
| CN | 102387545 A | 3/2012 |

(Continued)

*Primary Examiner* — Saba Tsegaye
(74) *Attorney, Agent, or Firm* — McDonald Hopkins LLC (57) ABSTRACT

Disclosed are a method for implementing parallel multiuser data transmission and a primary node. The method includes: a primary node acquires a transmission opportunity or a service period; and the primary node utilizes a control/management frame carrying uplink multiuser control information to instruct a secondary node to perform uplink multiuser data transmission in the transmission opportunity or the service period.

18 Claims, 5 Drawing Sheets

(56) References Cited

U.S. PATENT DOCUMENTS

2012/0314697 A1    12/2012  Noh et al.
2013/0229996 A1     9/2013  Wang et al.
2015/0063320 A1*    3/2015  Merlin .................... H04L 47/12
                                                        370/336
2015/0319700 A1*   11/2015  Oteri ..................... H04W 52/28
                                                        455/127.1

FOREIGN PATENT DOCUMENTS

CN         102771059 A    11/2012
CN         102781097 A    11/2012

* cited by examiner

Prior Art

PARALLEL MULTIUSER DATA TRANSMISSION METHOD AND PRIMARY NODE

CROSS REFERENCE TO RELATED APPLICATIONS

Technical Field

The present document relates to the technical field of wireless local area networks.

BACKGROUND

Currently, more and more people use wireless local area networks (WLANs) to perform data communications. The burden of WLAN networks are aggravated increasingly, and with the increasing of WLAN users, the efficiency of using WLAN networks to perform data communications will also tend to decline obviously. In this case, the efficiency declining of using WLAN networks to perform data communications cannot be prevented merely by improving the rate of WLAN networks.

Thus, IEEE standard organization established relevant task groups which are dedicated to solving the WLAN network efficiency problem. Parallel multiuser data transmission is used as an alternative technology of solving network efficiency and has been paid attention and researches extensively. Currently, the parallel multiuser data transmission technology researched by the HEW group includes space domain multiple access Multi-User MIMO (MU-MIMO) technology, frequency domain multiple access Orthogonal Frequency Division Multiple Access (OFDMA) technology and code division domain multiple access Interleave-Division Multiple-Access (IDMA) technology.

Figure 1:
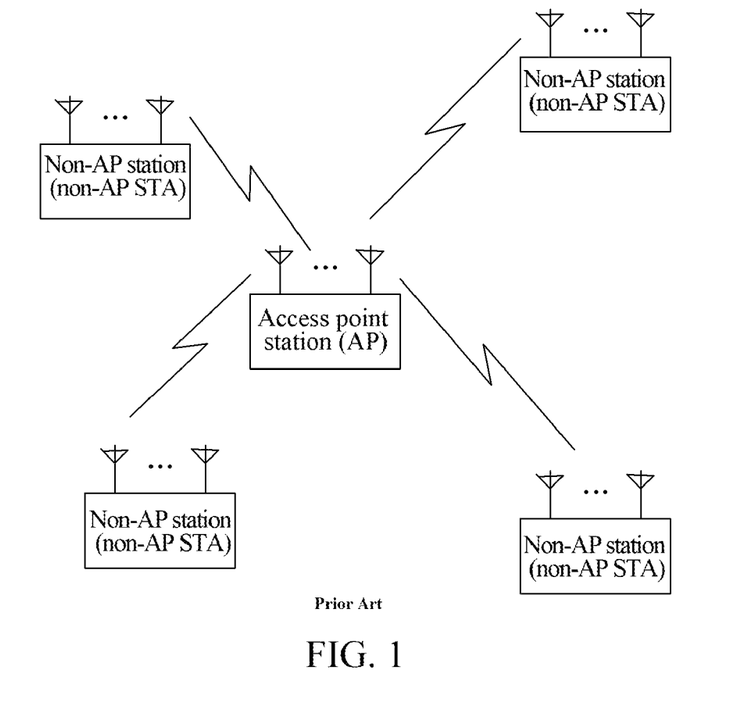
FIG. 1 is a schematic diagram of constitution of a basic service set in a WLAN network.

FIG. 1 is a schematic diagram of constitution of a basic service set in a WLAN network. As shown in FIG. 1, in the WLAN network, one Access Point (AP) and a plurality of non-AP Stations (non-AP STAs) associated with this AP constitute a basic service set (BSS). Generally, parallel multiuser data transmission in the WLAN network is that a plurality of secondary nodes transmit data to a primary node simultaneously, which is also referred to as uplink multiuser data transmission; or a primary node transmits data to a plurality of secondary nodes simultaneously, which is also referred to as downlink multiuser data transmission. The primary node generally refers to an AP or a non-AP STA which has special capabilities, and the secondary node generally refers to a non-AP STA.

It can be seen from the above analysis that the uplink multiuser data transmission used by the WLAN network is parallel multiuser data transmission, which can effectively improve the efficiency of the WLAN network. However, currently, it is not provided any particular solutions of implementing parallel multiuser data transmission, and there are many problems to be solved. For example, how the AP schedules a plurality of uplink users and answers the data and completes multi-frame transmission, how to perform error recovery, i.e., retransmission when a receiving error occurs in uplink multiuser data, and how to flexibly schedule a user with less overhead to maximize resource utilization and so on.

In summary, the implementation of parallel multiuser data transmission in the WLAN network cannot be ensured.

SUMMARY

The following is a summary of the subject matter described in detail herein. The summary is not intended to limit the protection scope of the claims.

A parallel multiuser data transmission method and a primary node are provided by the embodiments of the present document, which can ensure the implementation of parallel multiuser data transmission in a WLAN network.

A method for implementing parallel multiuser data transmission is provided by an embodiment of the present document, and the method includes: a primary node acquiring a transmission opportunity (TXOP) or a service period (SP); and the primary node utilizing a control/management frame carrying uplink multiuser control information to instruct a secondary node to perform uplink multiuser data transmission in the transmission opportunity or the service period.

The method further includes: the primary node receiving uplink parallel multiuser data, and utilizing a control/management frame carrying multiple pieces of user data acknowledgement/paging information to acknowledge the received uplink parallel multiuser data; and utilizing the control/management frame carrying the uplink multiuser control information to first schedule one or more users to perform the uplink multiuser data transmission during multi-frame transmission.

The method further includes: the primary node utilizing the control/management frame carrying the uplink multiuser control information to instruct users to perform uplink retransmission.

The parallel multiuser data transmission is within one transmission opportunity (TXOP) or service period (SP); and the method further includes: time occupied by multiuser multi-frame exchange in the parallel multiuser data transmission being within a preset time threshold, herein the time threshold is a limit value of a duration of the TXOP or SP.

The time threshold of the TXOP or SP is of a fixed duration, or the time threshold of the TXOP or SP is determined by data attributes, station attributes, or quality of service (QoS) demands of uplink multiuser.

The control/management frame at least includes a frame header and a frame body.

The frame header includes: a transmission address field, a receiving address field and a frame control field, the transmission address field is used for indicating address information of a device for transmitting a feedback frame, the receiving address field is used for indicating destination information of receiving the feedback frame, and the frame control field is used for indicating that the frame where the frame control field is located is a feedback frame carrying multiple pieces of user data acknowledgement/paging information.

The frame body includes: an acknowledgement/paging control field, M null acknowledgement/paging information fields, and N acknowledgement/paging information fields, herein each acknowledgement/paging information field or null acknowledgement/paging information field corresponds to one user of uplink multiuser data transmission, and an expression "M+N" represents a total number of users.

Herein the null acknowledgement/paging information field is used for instructing uplink multiuser to transmit uplink data at the beginning of a transmission period, first scheduling a certain user or some users to perform the uplink multiuser data transmission during multi-frame transmission, or instructing a user to perform uplink retransmission.

In an exemplary embodiment, the acknowledgement/paging control field includes: a frame format control field and a user number field, herein the frame format control field is used for indicating that the control/management frame is used for the acknowledgement/paging of uplink multiuser data, and the user number field is used for indicating the number of the acknowledgement/paging information fields and the number of the null acknowledgement/paging information fields.

In an exemplary embodiment, the acknowledgement/paging control field includes: a frame format control field, a user number field and a paging indication field, herein the frame format control field is used for indicating that the control/management frame is used for the acknowledgement/paging of uplink multiuser data, the user number field is used for indicating there are how many acknowledgement/paging information fields and how many null acknowledgement/paging information fields subsequently, a value of the user number field is the user number "M+N" in the uplink multiuser data transmission, and the paging indication field is used for indicating whether the corresponding user is still able to transmit uplink data in a subsequent uplink multiuser radio frame.

Indicating the user number "M+N" in the uplink multiuser data transmission includes: respectively indicating values of M and N, or a value of M+N, or a value of M, or a value of N through the fields in the acknowledgement/paging control field; or, indicating a value of (M+N) through the field in the acknowledgement/paging control field, and each null acknowledgement/paging information field or acknowledgement/paging information field indicating a format used by the null acknowledgement/paging information field or the acknowledgement/paging information field through bits.

An arrangement of the M null acknowledgement/paging information fields and N acknowledgement/paging information fields in the control/management frame is that: the N acknowledgement/paging information fields are arranged in the front, and the M null acknowledgement/paging information fields are arranged after the N acknowledgement/paging information fields; or, the M null acknowledgement/paging information fields are arranged in the front, and the N acknowledgement/paging information fields are arranged after the M null acknowledgement/paging information fields.

The acknowledgement/paging information field includes: a identification field and a paging indication field, herein the user identification field is used for representing a user corresponding to the acknowledgement/paging information field; and the paging indication field is used for indicating whether the user still can transmit uplink data in a subsequent uplink multiuser radio frame.

The acknowledgement/paging information field includes: a user identification field and a resource indication field, herein the user identification field is used for representing a user corresponding to the acknowledgement/paging information field; and the resource indication field is used for indicating a resource range used by the user who is allowed for performing uplink data transmission in the next uplink multiuser data transmission.

The acknowledgement/paging information field further includes: an acknowledgement information bitmap, a data stream identification field and acknowledgement information sequence control information, herein the acknowledgement information bitmap is a bit map, and each bit corresponds to a right-wrong indication of a data unit in a data stream; the data stream identification field is used for representing an identification of the data stream at which the data unit, corresponding to the right-wrong indication in the acknowledgement information bitmap, is located; and the acknowledgement information sequence control information is used for representing a sequence number range of the data unit corresponding to the right-wrong indication in the acknowledgement information bitmap.

The null acknowledgement/paging information field includes: a user identification field and a resource filed, the user identification field is used for indicating an identification of a user, and the resource field is used for representing a resource used by the instructed user to transmit uplink data or perform uplink retransmission.

In an exemplary embodiment, the null acknowledgement/paging information field does not include an acknowledgement information bitmap.

In an exemplary embodiment, the null acknowledgement/paging information field does not include an acknowledgement information bitmap and acknowledgement information sequence control information.

The null acknowledgement/paging information field further includes uplink transmission parameter information to be modulated for indicating uplink transmission; uplink transmission parameters include: transmission power control and/or a frequency offset pre-correction and/or a time delay parameter and/or a frequency domain for uplink transmission/a parameter of a space domain resource range.

The frame header further includes a duration field for determining a length of an uplink multiuser radio frame of a user, who is instructed to be still capable of transmitting uplink data, in next uplink multiuser data transmission.

The present document also provides a primary node, at least including an acquisition module and a control module.

The acquisition module is arranged to acquire a transmission opportunity or a service period; and the control module is arranged to utilize a control/management frame carrying uplink multiuser control information, and instruct a secondary node to perform uplink multiuser data transmission in the transmission opportunity or the service period.

The acquisition module is further arranged to receive uplink parallel multiuser data; and the control module is further arranged to utilize a control/management frame carrying multiple pieces of user data acknowledgement/paging information to acknowledge the received uplink parallel multiuser data, and utilize the control/management frame carrying the uplink multiuser control information to first schedule one or more users to perform the uplink multiuser data transmission during multi-frame transmission.

The control module is further arranged to the primary node utilize the control/management frame carrying the uplink multiuser control information to instruct users to perform uplink retransmission.

The control/management frame includes a frame header and a frame body.

The frame header includes: a transmission address field, a receiving address field and a frame control field, herein the transmission address field is used for indicating address information of a device for transmitting a feedback frame, the receiving address field is used for indicating destination information of receiving the feedback frame and the frame control field is used for indicating that the frame where the frame control field is located is a feedback frame carrying multiple pieces of user data acknowledgement/paging information.

The frame body includes: an acknowledgement/paging control field and M null acknowledgement/paging information fields and N acknowledgement/paging information fields, herein each acknowledgement/paging information field or null acknowledgement/paging information field corresponds to one user of the uplink multiuser data transmission, and an expression "M+N" represents a total number of users.

Herein the null acknowledgement/paging information field is used for instructing uplink multiuser to transmit uplink data at the beginning of a transmission period or first scheduling one or more users to perform the uplink multiuser data transmission during multi-frame transmission or instructing a user to perform uplink retransmission.

In an exemplary embodiment, the acknowledgement/paging control field includes: a frame format control field and a user number field, herein the frame format control field is used for indicating that the control/management frame is used for the acknowledgement/paging of uplink multiuser data and the user number field is used for indicating the number of the acknowledgement/paging information fields and the number of the null acknowledgement/paging information fields.

In an exemplary embodiment, the acknowledgement/paging control field includes: a frame format control field, a user number field and a paging indication field, herein the frame format control field is used for indicating that the control/management frame is used for the acknowledgement/paging of uplink multiuser data, the user number field is used for indicating there are how many acknowledgement/paging information fields and how many null acknowledgement/paging information fields subsequently, a value of the user number field is the user number "M+N" in the uplink multiuser data transmission, and the paging indication field is used for indicating whether each user is still able to transmit uplink data in a subsequent uplink multiuser radio frame.

Indicating the user number "M+N" in the uplink multiuser data transmission includes: respectively indicating values of M and N, or a value of M+N, or a value of M, or a value of N through the fields in the acknowledgement/paging control field; or, indicating a value of (M+N) through the field in the acknowledgement/paging control field, and each null acknowledgement/paging information field or acknowledgement/paging information field indicating a format used by the null acknowledgement/paging information field or the acknowledgement/paging information field through bits.

An arrangement of the M null acknowledgement/paging information fields and N acknowledgement/paging information fields in the control/management frame is that: the N acknowledgement/paging information fields are arranged in the front, and the M null acknowledgement/paging information fields are arranged after the N acknowledgement/paging information fields; or, the M null acknowledgement/paging information fields are arranged in the front, and the N acknowledgement/paging information fields are arranged after the M null acknowledgement/paging information fields.

In an exemplary embodiment, the acknowledgement/paging information field includes: a user identification field, a resource indication field and a paging indication field, herein the user identification field is used for representing a user corresponding to the acknowledgement/paging information field; the resource indication field is used for indicating a resource range used by the user who is allowed for performing uplink data transmission in the next uplink multiuser data transmission; and the paging indication field is used for indicating whether the user still can transmit uplink data in a subsequent uplink multiuser radio frame.

In an exemplary embodiment, the acknowledgement/paging information field includes: a user identification field and a resource indication field, herein the user identification field is used for representing a user corresponding to the acknowledgement/paging information field; and the resource indication field is used for indicating a resource range used by the user who is allowed for performing uplink data transmission in the next uplink multiuser data transmission.

The acknowledgement/paging information field further includes: an acknowledgement information bitmap, a data stream identification field and acknowledgement information sequence control information, herein the acknowledgement information bitmap is a bit map, and each bit corresponds to a right-wrong indication of a data unit in a data stream; the data stream identification field is used for representing an identification of the data stream at which the data unit, corresponding to the right-wrong indication in the acknowledgement information bitmap, is located; and the acknowledgement information sequence control information is used for representing a sequence number range of the data unit corresponding to the right-wrong indication in the acknowledgement information bitmap.

The null acknowledgement/paging information field includes: a user identification field and a resource filed, the user identification field is used for indicating an identification of a user, and the resource field is used for representing a resource used by the instructed user to transmit uplink data or perform uplink retransmission.

In an exemplary embodiment, the null acknowledgement/paging information field does not include an acknowledgement information bitmap.

In an exemplary embodiment, the null acknowledgement/paging information field does not include an acknowledgement information bitmap and acknowledgement information sequence control information.

The null acknowledgement/paging information field further includes uplink transmission parameter information to be modulated for indicating uplink transmission; uplink transmission parameters include: transmission power control and/or a frequency offset pre-correction and/or a time delay adjustment.

The frame header further includes a duration field for determining the length of an uplink multiuser radio frame of a user, who is instructed to be still capable of transmitting uplink data, in next uplink multiuser data transmission.

An embodiment of the present document also provides a computer-readable storage medium storing computer-executable instructions, when the instructions are executed, to perform the method mentioned above.

By means of the method of the embodiments of the present document, it is realized that an AP can respond uplink multiuser data, and it is ensured of the implementation of parallel multiuser data transmission in the WLAN network. Moreover, in the embodiments of the present document, a null acknowledgement/paging information field is set in a control/management frame so as to provide an implementation solution of, such as, instructing uplink multiuser to transmit uplink data at the beginning of a transmission period, first scheduling a certain user or some users to perform the uplink multiuser data transmission during the multi-frame transmission, or instructing a user to perform uplink retransmission.

The features and advantages of the present document will be described in the following description or understood through the implementation of the present document. The other advantages of the present document can be implemented and obtained through the description, the claims and the structure specially designated in the accompanying drawings.

Other aspects can be understood upon reading and understanding the accompanying drawings and detailed description.

BRIEF DESCRIPTION OF DRAWINGS

The accompanying drawings described herein are used to provide further understanding of the embodiments of the present document, which constitute a part of the present application. In the drawings.

DETAILED DESCRIPTION

Embodiments of the present document will be described in detail hereinafter in conjunction with the accompanying drawings. It should be noted that the embodiments of the present document and the features in the embodiments may be combined with each other in a case of no conflicting.

It should also be noted that the symbol herein "I" is used for representing "or".

Figure 2:
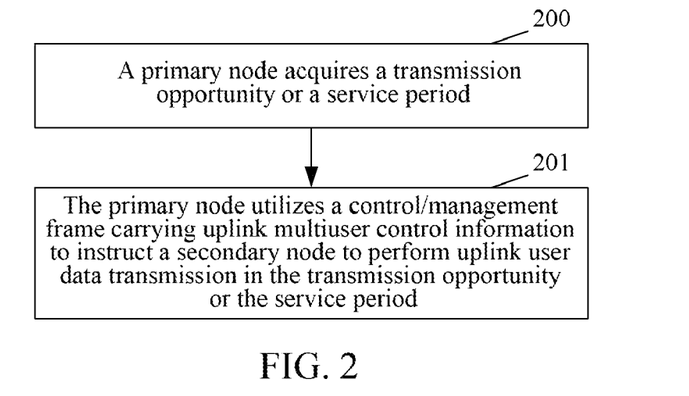
FIG. 2 is a flowchart of a method for implementing parallel multiuser data transmission according to an embodiment of the present document.

FIG. 2 is a flowchart of a method for implementing parallel multiuser data transmission according to an embodiment of the present document. As shown in FIG. 2, the method includes the following steps.

In step 200, a primary node acquires a transmission opportunity (TXOP) or a service period.

The particular implementation of this step is a customary technical means in the art and is not intended to limit the protection scope of the present document, which will not be described here.

It should be noted that the duration of a TXOP or service period (SP) is limited, that is, it has a time threshold, and time occupied by multiuser multi-frame exchange shall not exceed this time threshold. The time threshold of the TXOP or service period can be of a fixed duration and may also be determined by data attributes, station attributes, or quality of service (QoS) demands of uplink multiuser. It should be noted that in the existing protocol, data of a kind of QoS is sent within one TXOP, the high and low of the QoS level and the service transmission attributes determine the duration in which continuous transmission can be performed, but uplink multiuser relates to data of a plurality of stations and different stations may have a plurality of QoS requirements.

Here, the time threshold should be considered in combination according to the demand of multiple users. For example, the QoS can be determined according to the data of the highest priority in the multiuser data, or the time threshold can be determined according to the data QoS of a specific station STA, such as SAT1. There are many particular implementations, and here it should be emphasized that making considerations in combination according to the demand of multiple users is not intended to limit the protection scope of the present document as long as those skilled in the art deems proper.

In step 201, the primary node utilizes a control/management frame carrying uplink multiuser control information to instruct a secondary node to perform uplink multiuser data transmission in the transmission opportunity or the service period.

The method of the embodiment of the present document may further include: the primary node receives uplink parallel multiuser data, and utilizes a control/management frame carrying multiple pieces of user data acknowledgement/paging information to acknowledge the received uplink parallel multiuser data, and the primary node utilizes the control/management frame carrying the uplink multiuser control information to first schedule one or more users to perform the uplink multiuser data transmission during the multi-frame transmission.

The method of the embodiment of the present document may further include: the primary node utilizes the control/management frame carrying the uplink multiuser control information to instruct users to perform uplink retransmission.

Figure 3:
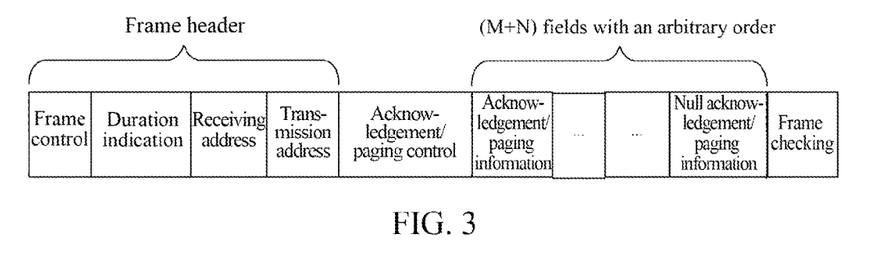
FIG. 3 is a schematic diagram of constitution of a radio frame carrying multiple pieces of user data acknowledgement/paging information according to an embodiment of the present document.

The particular constitution of the control/management frame in this step is as shown in FIG. 3 and at least includes a frame header and a frame body.

The frame header may include a transmission address domain, a receiving address domain, a frame control domain and a duration domain.

The transmission address domain is used for indicating address information of a device for transmitting the control/management frame.

The receiving address field is used for receiving destination information of the control/management frame. In an exemplary embodiment, with respect to the control/management frame, the destination information of the receiving address field can be configured as a broadcast or multi-cast address. If the receiving address field is configured as a multi-cast address, the destination information is multiple users of uplink multiuser data transmission. Here, the receiving address can be configured as this multi-cast address in a feedback frame merely by binding a plurality of stations (corresponding to multiple users) and a specific multi-cast address through interaction with the management frame in advance, which address is generally referred to as Media Access Control (MAC) address.

The frame control field is used for indicating that the frame where the frame control field is located is a control/management frame carrying uplink multiuser control information, and contains parameters such as frame type/subframe type. Or, the frame control field is used for indicating that the frame where it is located is a control/management frame carrying uplink multiuser control information together with a frame format control field in the acknowledgement/paging control field in the frame body.

The duration field is used for determining a length of a radio frame of multiuser data in the next uplink multiuser data transmission.

As shown in FIG. 3, the frame body may include an acknowledgement/paging control field and M null acknowledgement/paging information fields and N acknowledgement/paging information fields. Each null acknowledgement/paging information field or acknowledgement/paging information field corresponds to one user. (M+N) is the total number of the users indicated by the control/management frame where the frame body is located. M and N can both be 0 or a positive integer. The length of the null acknowledgement/paging information field can be equal to that of the acknowledgement/paging information field.

Figure 4:
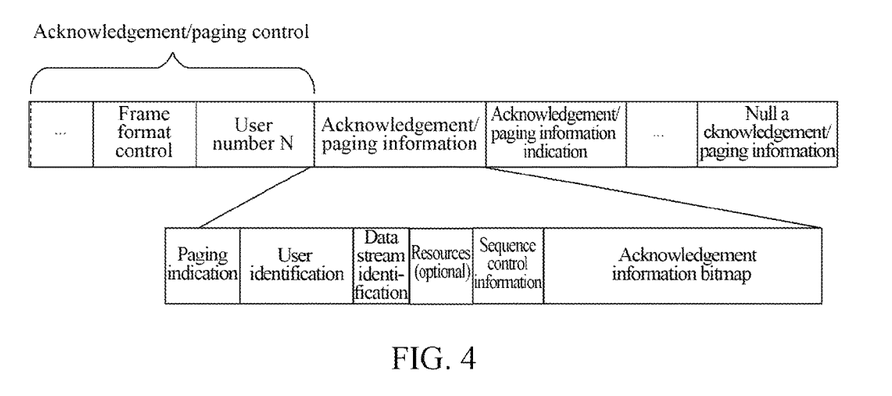
FIG. 4 is a schematic diagram of constitution of an acknowledgement/paging control field and an acknowledgement/paging information field in a frame body according to an embodiment of the present document.

FIG. 4 is a schematic diagram of constitution of an acknowledgement/paging control field and an acknowledgement/paging information field in a frame body according to an embodiment of the present document.

As shown in FIG. 4, the acknowledgement/paging control field may include: a frame format control field and a user number field. The frame format control field is used for indicating that the control/management frame is used for the acknowledgement/paging of uplink multiuser data and the user number field is used for indicating the number of the acknowledgement/paging information fields and the number of the null acknowledgement/paging information fields. The value of the user number field is the user number (M+N) of uplink multiuser data transmission. M and N can be 0 or a positive integer.

Or, the acknowledgement/paging control field may include a frame format control field, a user number field and a paging indication field.

Herein, the frame format control field is used for indicating that the control/management frame is used for the acknowledgement/paging of uplink multiuser data. The user number field is used for indicating there are how many acknowledgement/paging information fields and how many null acknowledgement/paging information fields subsequently. The value of the user number field is the user number (M+N) in the uplink multiuser data transmission. M and N can be 0 or a positive integer. The paging indication field is used for indicating whether each user still can transmit uplink data in a subsequent uplink multiuser radio frame. In an exemplary embodiment, the paging indication field being true represents that the user can transmit uplink data in a subsequent uplink multiuser radio frame and the paging indication field being false represents that the user cannot transmit uplink data in a subsequent uplink multiuser radio frame.

Indicating the user number (M+N) in uplink multiuser data transmission may include: indicating values of M and N, a value of (M+N), a value of M, or a value of N respectively through the fields in the acknowledgement/paging control field. For example, M and N can be instructed respectively with fields, or ordinary indication methods can be used to indicate one of (M+N) and (M or N).

Or, the value of "M+N" is indicated through the field in the acknowledgement/paging control field, and each null acknowledgement/paging information field or acknowledgement/paging information field indicates the format used by the null acknowledgement/paging information field or the acknowledgement/paging information field through bits. It should be noted that when such an indication method is used, since each information field has its own format indication, the null acknowledgement/paging information field and acknowledgement/paging information field can be arranged arbitrarily and merely the total number (M+N) needs to be indicated.

In an exemplary embodiment, the arrangement of the M null acknowledgement/paging information fields and N acknowledgement/paging information fields in the control/management frame is that: the N acknowledgement/paging information fields are arranged in the front and the M null acknowledgement/paging information fields are arranged after the N acknowledgement/paging information fields; or, the M null acknowledgement/paging information fields are arranged in the front and the N acknowledgement/paging information fields are arranged after the M null acknowledgement/paging information fields.

As shown in FIG. 4, the acknowledgement/paging information field may include: a user identification field, a resource indication field and a paging indication field.

The user identification field is used for representing a user corresponding to the acknowledgement/paging information field which can be an association identification (AID) of the user who transmits uplink data, such as secondary node and so on.

The resource indication field is used for indicating a resource range used by the user who is allowed for performing uplink data transmission in the next uplink multiuser data transmission, herein the resource can be frequency domain, time domain, code division domain and space division domain and so on.

The paging indication field is used for indicating whether the user corresponding to the acknowledgement/paging information field still can transmit uplink data in a subsequent uplink multiuser radio frame. In an exemplary embodiment, the paging indication field being true represents that the user can transmit uplink data in the subsequent uplink multiuser radio frame and the paging indication field being false represents that the user cannot transmit uplink data in the subsequent uplink multiuser radio frame. It should be noted that if a paging indication field is included in the acknowledgement/paging control field, then the paging indication field can be omitted in the acknowledgement/paging information field.

In an exemplary embodiment, the acknowledgement/paging information field may further include: an acknowledgement information bitmap, a data stream identification field and acknowledgement information sequence control information.

The acknowledgement information bitmap is a bit map, and each bit corresponds to a right-wrong indication of a data unit in a data stream.

The data stream identification field is used for representing an identification of the data stream at which the data unit, corresponding to the right-wrong indication in the acknowledgement information bitmap, is located.

The acknowledgement information sequence control information is used for representing a sequence number range of the data unit corresponding to the right-wrong indication in the acknowledgement information bitmap.

Figure 5:
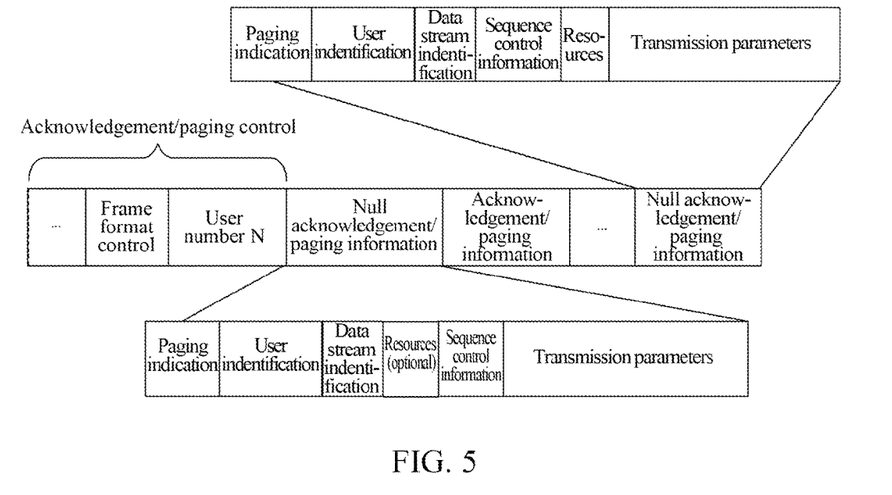
FIG. 5 is a schematic diagram of constitution of a null acknowledgement/paging information field in a frame body according to an embodiment of the present document.

FIG. 5 is a schematic diagram of constitution of a null acknowledgement/paging information field in a frame body according to an embodiment of the present document.

As shown in FIG. 5, the null acknowledgement/paging information field is used for instructing uplink multiuser to transmit uplink data at the beginning of a transmission period or first scheduling one or more users to perform uplink multiuser data transmission during multi-frame transmission or instructing a user to perform uplink retransmission.

The null acknowledgement/paging information field may include: a user identification field and a resource filed. the user identification field is used for indicating an identification of a user, which can be the AID of a station, and the resource field is used for representing a resource used by the instructed user to transmit uplink data or perform uplink retransmission.

In an exemplary embodiment, the null acknowledgement/paging information field does not include an acknowledgement information bitmap.

The null acknowledgement/paging information field may further include a data stream identification and acknowledgement information sequence control information. The specific values or reservation bits of these fields indicate that the current field is a null acknowledgement/paging information field, that is, the null acknowledgement/paging information field does not contain an acknowledgement about whether the data is correctly received. For example, for the acknowledgement/paging format, some bits in the acknowledgement information sequence control information are fixedly set as 0 (segment indication); and for the null acknowledgement format, this bit can be set as a non-zero value so as to distinguish the two information field formats. As another example, each information field indicates its own format through some bits. In the null acknowledgement/paging information field, if a format consistent with the acknowledgement/paging information field is utilized, the acknowledgement information bitmap is null acknowledgement, that is, being set as all 0s; and the paging indication is true by default or the paging indication is fixedly set as true.

In an exemplary embodiment, the null acknowledgement/paging information field may further include that an AP indicates uplink transmission parameter information to be modulated to an STA when performing the uplink transmission. Herein the uplink transmission parameters may include a time delay parameter and/or a frequency offset modulation parameter and/or a transmission power parameter, and so on.

In an exemplary embodiment, the feedback frame in this step may further include frame checking for determining whether the frame is correctly received for checking. This is CRC checking and how to implement CRC checking is not intended to limit the protection scope of the present document, which will not be described here.

In an exemplary embodiment, the null acknowledgement/paging information field does not include the acknowledgement information bitmap and acknowledgement information sequence control information.

It should be noted that in the constitution diagrams of the control/management frame shown in FIGS. 3 to 5, the order of each information field is not limited and those skilled in the art can readily know other combinations and the particular sequence thereof is not intended to limit the protection scope of the present document, which will be not described here.

By means of the method according an embodiment of the present document, it is realized that an AP can respond the uplink multiuser data and it is ensured of the implementation of parallel multiuser data transmission in the WLAN network. Moreover, in the present document, a null acknowledgement/paging information field is set in a control/management frame so as to provide an implementation solution of, such as, instructing uplink multiuser to transmit uplink data at the beginning of a transmission period, first scheduling one or more users to perform the uplink multiuser data transmission during the multi-frame transmission or instructing a user to perform uplink retransmission.

Figure 6:
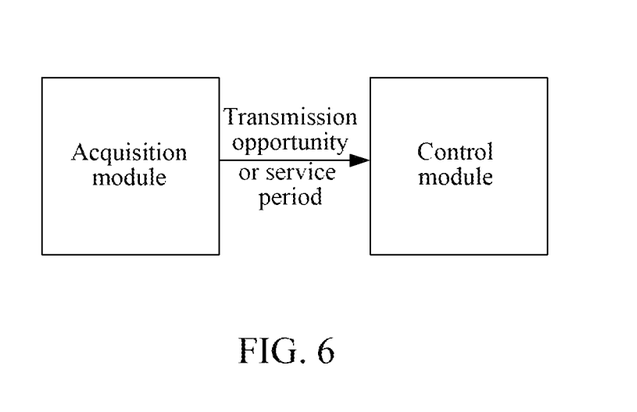
FIG. 6 is a schematic diagram of a construction of a primary node according to an embodiment of the present document.

FIG. 6 is a schematic diagram of a construction of a primary node according to an embodiment of the present document. As shown in FIG. 6, the primary node at least includes an acquisition module and a control module.

The acquisition module is arranged to acquire a transmission opportunity or a service period.

The control module is arranged to utilize a control/management frame carrying uplink multiuser control information, and instruct a secondary node to perform uplink multiuser data transmission in the transmission opportunity or the service period.

The method according to an embodiment of the present document will be described in detail hereinafter.

According to the provisions of the protocol, when one AP establishes one BSS, an association authentication process will be performed between a plurality of non-AP STAs and the AP to form one BSS. During the above association authentication process, the AP can interact capability information with each non-AP STA, the capability information including an indication of whether uplink multiuser transmission capability is supported.

Figure 7:
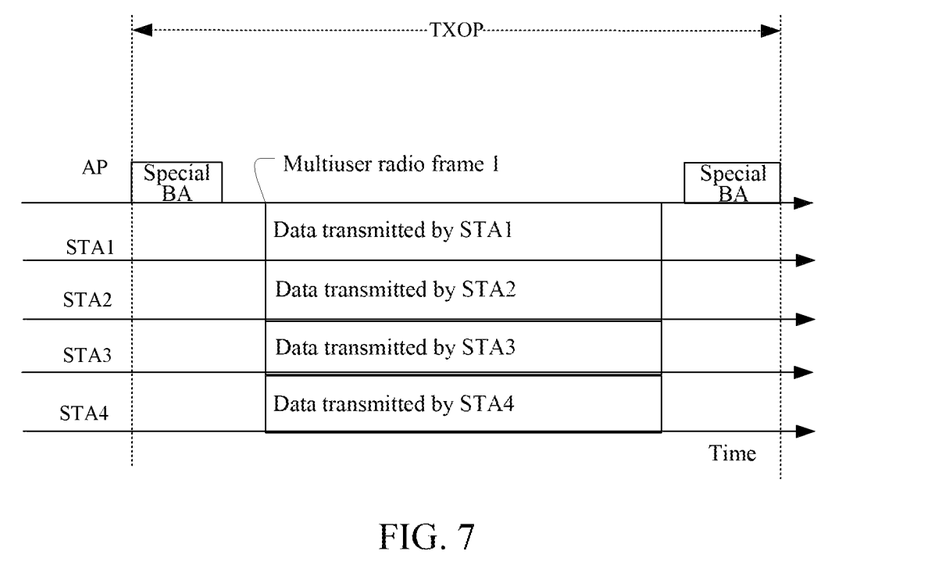
FIG. 7 is a schematic diagram of a first embodiment of implementing parallel multiuser data transmission according to an embodiment of the present document.

FIG. 7 is a schematic diagram of a first embodiment of implementing parallel multiuser data transmission according to an embodiment of the present document. As shown in FIG. 7, in the first embodiment, it is assumed that association stations STA1-STA4 support uplink multiuser data transmission and STA1-STA4 make agreement or negotiation with the AP respectively of supporting the use of a control/management frame carrying uplink multiuser control information.

First, it is assumed that the AP contends for transmitting the control/management frame carrying uplink multiuser control information, which is a special block acknowledgement frame, that is, special BA frame. Then, the AP obtains one TXOP. The special BA frame carries uplink multiuser control information of STA1, STA2, STA3 and STA 4, and the formats are all determined as a null acknowledgement/paging field format.

In the first embodiment, it is assumed that the user identification field in the null acknowledgement/paging field indicates the identification of STA1 and indicates or allows by default STA1 to perform uplink multiuser transmission, that is, the paging indication is true by default, that is, STA1 can perform uplink parallel transmission of an uplink multiuser radio frame 1. In addition, the parameter information field and the resource filed in the null acknowledgement/paging field also indicate transmission parameters and resources of the uplink multiuser data transmission of STA1 respectively. The processing procedures of STA2-STA4 are similar. It is assumed that the parameter information field and the resource field in the null acknowledgement/paging field corresponding to STA4 do not indicate the transmission parameters and resources of uplink multiuser data transmission. Here, the transmission parameters may include time delay parameter, frequency offset modulation parameter, power parameter and so on, and the resources may be frequency domain, time domain, code division domain, space division domain and so on.

In the special BA frame of the first embodiment, it is assumed that the frame header may include a duration field for determining the transmission time of the uplink multiuser radio frame 1 of uplink parallel transmission and for avoiding the appointed channel time of a station except STA1-STA3 to access a channel. In an exemplary embodiment, the value of duration may be: a value of a product of constant 2 and short interframe space (SIFS), a value of the sum of the desired transmission time of multiuser radio frame 2 and the transmission time of the feedback frame of the radio frame 2. The desired transmission time of multiuser radio frame 2 is determined by the AP itself, which is a value calculated by multiuser. The transmission time of the feedback frame of the radio frame 2 can be a time configured according to the agreement in advance (the time of the feedback frame is relatively fixed), or a time determined according to preset rules. For example, the time of the next feedback frame can be defined as the transmission time of the current feedback frame and so on. That is, after the station receives the duration field, the time limit of the uplink transmission radio frame 2 can be obtained by subtracting the interframe space from the value of the duration field and then subtracting the preset feedback frame time.

Then, after STA1-STA4 receive the special BA frame from the AP, it determines that the frame may include its own null acknowledgement/paging information to allow uplink transmission, then the parallel uplink transmission of the multiuser radio frame 1 is performed at the same time after short interframe space (SIFS), and the transmission time is determined according to the value of the duration field in the special BA frame in this embodiment. At the same time, STA1-STA3 transmit the uplink multiuser radio frame 1 according to the indications of the transmission parameter information field and the resource field. In this embodiment, STA4 does not receive the indications of the transmission parameter information field and the resource field, and thus, STA4 can use the parameter and resource of the last uplink multiuser transmission or use a preset parameter and resource to transmit the radio frame 1. For other audit stations, after receiving the special BA frame in this embodiment, a timer (NAV, Network Allocation Vector) is configured according to the value of the duration field in the special BA frame, and when the value of this timer does not reach 0, the audit stations cannot contend for the channel.

Then, the AP receives the uplink multiuser radio frame 1 and returns a feedback frame to each STA, the frame type or format thereof being block acknowledgement (BA) frame which includes acknowledgement/paging field information to STA1-STA4, that is, block acknowledgement information of the data in the radio frame 1 sent by each of STA1-STA4 and the paging indication information to STA1-STA4, and it is assumed that the paging indication information of STA1-STA4 are all false, then this TXOP is ended.

Figure 8:
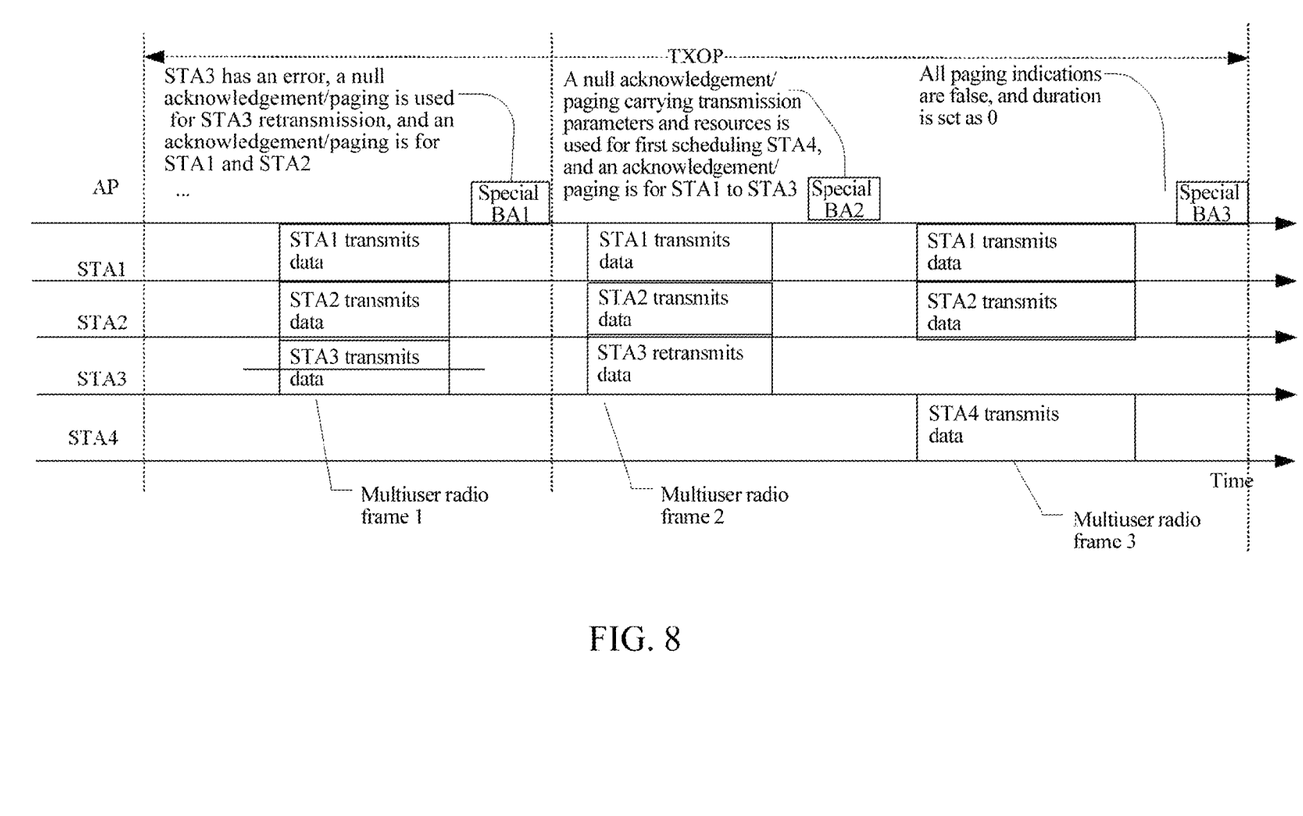
FIG. 8 is a schematic diagram of a second embodiment of implementing parallel multiuser data transmission according to an embodiment of the present document.

FIG. 8 is a schematic diagram of a second embodiment of implementing parallel multiuser data transmission according to an embodiment of the present document. As shown in FIG. 8, it is assumed that within one TXOP or service period, STA1, STA2 and STA3 perform uplink parallel transmission of an uplink multiuser radio frame.

First, an AP receives a multiuser radio frame 1 from STA1-STA3 and transmits a feedback frame 1. In the second embodiment, it is assumed that the data of STA3 is all received wrongly. In this embodiment, the frame type or format of the feedback frame 1 is configured as a control/management frame carrying uplink multiuser control information, that is, special BA1 frame. In an exemplary embodiment, it is implemented by configuring the frame type/subframe type in the frame control field in the special BA1 frame as a block acknowledgement frame and configuring the frame format control as the frame format of the control/management frame carrying uplink multiuser control information in the control field of the acknowledgement/paging field, or it is implemented by configuring that frame as the control/management frame of multiuser control information merely using the frame type/subframe type. In the control/management frame of this embodiment, there is acknowledgement/paging corresponding to STAT-STA2. In the acknowledgement/paging information field, the acknowledgement information represents that some or all data units in the radio frame 1 from STA1-STA2 are received correctly and the paging indication is configured as true, allowing STA1-STA2 to continue performing uplink multiuser data transmission. In addition, the null acknowledgement/paging field corresponding to STA3 indicates that all data units in the radio frame 1 from STA3 are erroneous but allows STA3 error recovery, that is, indicating that STA3 can retransmit uplink data.

Then, STA1-STA3 transmit a multiuser radio frame 2, and STA3 retransmits the erroneous data in the radio frame 1.

The AP receives the multiuser radio frame 2 from STA1-STA3 and transmits a feedback frame 2. Here, the frame type or format of the feedback frame 2 is configured as a control/management frame carrying uplink multiuser control information, that is, special BA2 frame. In an exemplary embodiment, the special BA2 frame may include acknowledgement/paging to STA1-STA3. In the acknowledgement/paging information field, the acknowledgement information represents that some or all data units in the radio frame 2 from STA1-STA3 are received correctly and the paging indications of STA1-STA2 are configured as true, allowing STA1-STA2 to continue performing uplink data transmission. In this embodiment, it is assumed that the paging indication of STA3 is configured as false and the uplink data transmission of STA3 is terminated. In addition, it is assumed that the special BA2 frame in this embodiment may further include a null acknowledgement/paging information field to STA4 for first scheduling STA4 to perform uplink multiuser data transmission within a TXOP or service period and the user identification field in the null acknowledgement/paging information field indicates the identification of STA4 and carries transmission parameter information and resource information.

Then, STA1, STA2 and STA4 transmit an uplink multiuser radio frame 3 and STA4 transmits data according to the transmission parameter information and resource information in the special BA2 frame.

It should be noted that the duration of the TXOP or service period is limited, that is, it has a time threshold. The occupation time of multiuser multi-frame exchange should not exceed this time threshold, that is, when STA1-STA4 complete transmitting a multiuser radio frame N, although more data indicates 1, AP configures the paging indications of all STAs as false in the feedback frame of the multiuser data acknowledgement/paging fed back to STA1-STA4 and configures the value of duration as 0 for ending multiuser multi-frame transmission. The time threshold of the TXOP or service period can be of a fixed duration or may also be determined by the data attributes, the station attributes, or the QoS demands of uplink multiuser.

Figure 9:
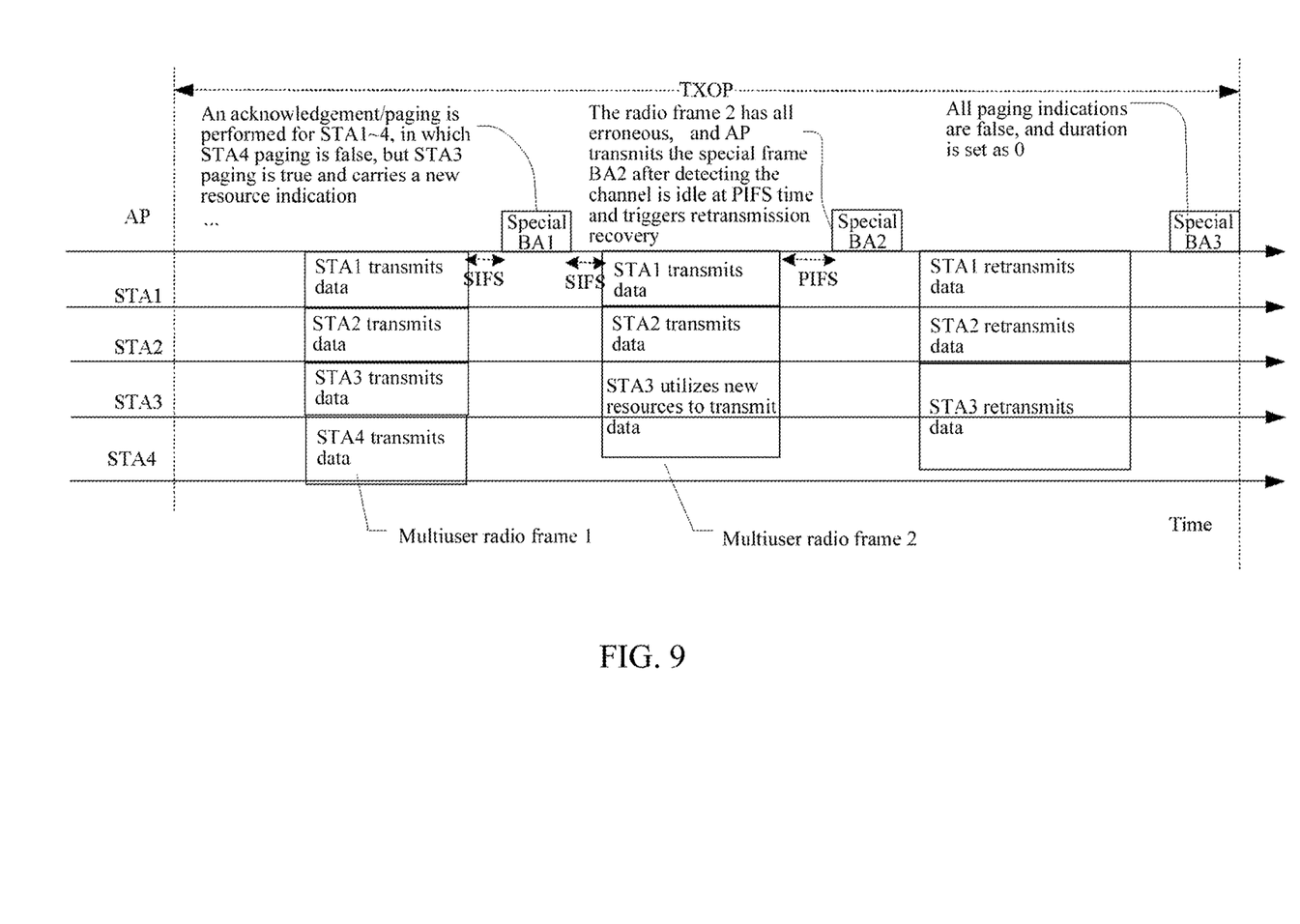
FIG. 9 is a schematic diagram of a third embodiment of implementing parallel multiuser data transmission according to an embodiment of the present document.

If some paging data is erroneous, the control/management frame in the present document is sent after SIFS to acknowledge correct user data and instruct the erroneous user to perform retransmission. If all paging data is erroneous, that is, the desired data signal is not received or the signal is received but it is all wrong, then the channel will be monitored with a PIFS or contention avoidance process. If the channel is idle in the above PIFA or contention avoidance process, then the control/management frame in the present document will be sent to instruct all erroneous users to perform retransmission. FIG. 9 is a schematic diagram of a third embodiment of implementing parallel multiuser data transmission according to an embodiment of the present document. As shown in FIG. 9, it is assumed that STA1, STA2, STA3 and STA4 performing uplink parallel transmission of uplink multiuser radio frames within one TXOP or service period.

First, an AP receives a multiuser radio frame 1 from STA1-STA4 and feeds back a control/management frame carrying uplink multiuser control information, that is, special BA1 frame. The special BA1 frame has acknowledgement/paging information fields to STA1-STA4 for the data acknowledgement of the radio frame 1. In the third embodiment, the paging indication corresponding to STA4 is configured as false, not allowing STA4 to continue transmitting uplink data. The paging indications corresponding to STA1-STA3 are all configured as true, that is, allowing STA1-STA3 to continue performing uplink data transmission and it is assumed that the resource indication field indicates a new resource to STA3. For example, the resource information indicates that STA3 can use the resource of STA4 plus its own original resource.

Then, after receiving the special BA1 frame SIFS, STA1-STA3 immediately transmit an uplink multiuser radio frame 2 and STA3 uses the new resource.

After completing transmitting the special BA1 frame, if the AP determines that no paging data is received or determines that all received paging data is erroneous, then channel detection will be performed at a Point (coordination function) Interframe Space (PIFS) or contention backoff time after the above determination. If the channel is idle, then the BA2 frame will be sent, triggering the error recovery process of STA1-STA3.

Then, after receiving the special BA2 frame SIFS, STA1-STA3 immediately transmit an uplink multiuser radio frame 3.

After receiving the radio frame 3, the AP transmits a special BA3 frame and uses the special BA3 frame to end the TXOP or service period.

An embodiment of the present document also provides a computer-readable storage medium storing computer-executable instructions, when the instructions are executed, to perform the method mentioned above.

Those skilled in the art may understand that all or some steps of the above embodiments may be implemented by computer program procedures which may be stored in a computer-readable storage medium and executed on a corresponding hardware platform (such as system, apparatus, device and so on), and when the instructions are executed, include one of the steps of the method embodiment or a combination thereof.

In an exemplary embodiment, all or some steps of the above embodiments may also be implemented with an integrated circuit, and these steps may be made into a single integrated circuit module respectively or some modules or steps may be made into a single integrated circuit module.

Various devices/functional modules/functional units in the above embodiments may be implemented with a general-purpose computer device which can be integrated on a single computer device and may also be distributed on a network of a plurality of computer devices.

Various devices/functional modules/functional units in the above embodiments may be stored in a computer-readable storage medium if being implemented with software functional modules and sold or used as independent products. The above-mentioned computer-readable storage medium may be a read-only memory, magnetic disk or optical disk and so on.

The forgoing is merely preferred embodiments of the present document and is not intended to limit the protection scope of the present document.

INDUSTRIAL APPLICABILITY

By means of the parallel multiuser data transmission method and the primary node provided by the embodiments of the present document, it is realized that an AP can respond uplink multiuser data, and it is ensured of the implementation of parallel multiuser data transmission in the WLAN network. Moreover, in the embodiments of the present document, a null acknowledgement/paging information field is set in a control/management frame so as to provide an implementation solution of, such as, instructing uplink multiuser to transmit uplink data at the beginning of a transmission period, first scheduling a certain user or some users to perform the uplink multiuser data transmission during the multi-frame transmission, or instructing a user to perform uplink retransmission.

What is claimed is:

1. A method for implementing parallel multiuser data transmission, comprising: a primary node acquiring a transmission opportunity (TXOP) or a service period (SP); and
    the primary node utilizing a control/management frame carrying uplink multiuser control information to instruct a secondary node to perform uplink multiuser data transmission in the transmission opportunity or the service period; wherein the control/management frame at least comprises a frame header and a frame body; wherein
    the frame header comprises: a transmission address field, a receiving address field and a frame control field, the transmission address field is used for indicating address information of a device for transmitting a feedback frame, the receiving address field is used for indicating destination information of receiving the feedback frame, and the frame control field is used for indicating that the frame where the frame control field is located is a feedback frame carrying multiple pieces of user data acknowledgement/paging information; and
    the frame body comprises: an acknowledgement/paging control field, M null acknowledgement/paging information fields, and N acknowledgement/paging information fields, wherein each acknowledgement/paging information field or null acknowledgement/paging information field corresponds to one user of uplink multiuser data transmission, and an expression "M+N" represents a total number of users;
    wherein the null acknowledgement/paging information field is used for instructing uplink multiuser to transmit uplink data at the beginning of a transmission period, first scheduling a certain user or some users to perform the uplink multiuser data transmission during multi-frame transmission, or instructing a user to perform uplink retransmission.

2. The method according to claim 1, further comprising:
    the primary node receiving uplink parallel multiuser data, and utilizing a control/management frame carrying multiple pieces of user data acknowledgement/paging information to acknowledge the received uplink parallel multiuser data; and
    utilizing the control/management frame carrying the uplink multiuser control information to first schedule one or more users to perform the uplink multiuser data transmission during multi-frame transmission.

3. The method according to claim 2, wherein the parallel multiuser data transmission is within one transmission opportunity (TXOP) or service period (SP); and
    the method further comprises: time occupied by multiuser multi-frame exchange in the parallel multiuser data transmission being within a preset time threshold, wherein the time threshold is a limit value of a duration of the TXOP or SP;

wherein the time threshold of the TXOP or SP is of a fixed duration, or the time threshold of the TXOP or SP is determined by data attributes, station attributes, or quality of service (QoS) demands of uplink multiuser.

4. The method according to claim 1, further comprising: the primary node utilizing the control/management frame carrying the uplink multiuser control information to instruct users to perform uplink retransmission.

5. The method according to claim 1, wherein
the acknowledgement/paging control field comprises: a frame format control field and a user number field, wherein the frame format control field is used for indicating that the control/management frame is used for the acknowledgement/paging of uplink multiuser data, and the user number field is used for indicating the number of the acknowledgement/paging information fields and the number of the null acknowledgement/paging information fields.

6. The method according to claim 5, wherein the acknowledgement/paging information field comprises: a user identification field and a paging indication field, wherein
the user identification field is used for representing a user corresponding to the acknowledgement/paging information field; and
the paging indication field is used for indicating whether the user still can transmit uplink data in a subsequent uplink multiuser radio frame.

7. The method according to claim 6, wherein the acknowledgement/paging information field further comprises: an acknowledgement information bitmap, a data stream identification field and acknowledgement information sequence control information, wherein
the acknowledgement information bitmap is a bit map, and each bit corresponds to a right-wrong indication of a data unit in a data stream;
the data stream identification field is used for representing an identification of the data stream at which the data unit, corresponding to the right-wrong indication in the acknowledgement information bitmap, is located; and
the acknowledgement information sequence control information is used for representing a sequence number range of the data unit corresponding to the right-wrong indication in the acknowledgement information bitmap.

8. The method according to claim 1, wherein
the acknowledgement/paging control field comprises: a frame format control field, a user number field and a paging indication field, wherein the frame format control field is used for indicating that the control/management frame is used for the acknowledgement/paging of uplink multiuser data, the user number field is used for indicating there are how many acknowledgement/paging information fields and how many null acknowledgement/paging information fields subsequently, a value of the user number field is the user number "M+N" in the uplink multiuser data transmission, and the paging indication field is used for indicating whether the corresponding user is still able to transmit uplink data in a subsequent uplink multiuser radio frame.

9. The method according to claim 8, wherein the acknowledgement/paging information field comprises: a user identification field and a resource indication field, wherein
the user identification field is used for representing a user corresponding to the acknowledgement/paging information field; and the resource indication field is used for indicating a resource range used by the user who is allowed for performing uplink data transmission in the next uplink multiuser data transmission.

10. The method according to claim 1, wherein indicating the user number "M+N" in the uplink multiuser data transmission comprises:
respectively indicating values of M and N, or a value of M+N, or a value of M, or a value of N through the fields in the acknowledgement/paging control field;
or, indicating a value of "M+N" through the field in the acknowledgement/paging control field, and each null acknowledgement/paging information field or acknowledgement/paging information field indicating a format used by the null acknowledgement/paging information field or the acknowledgement/paging information field through bits.

11. The method according to claim 1, wherein an arrangement of the M null acknowledgement/paging information fields and N acknowledgement/paging information fields in the control/management frame is that:
the N acknowledgement/paging information fields are arranged in the front, and the M null acknowledgement/paging information fields are arranged after the N acknowledgement/paging information fields;
or, the M null acknowledgement/paging information fields are arranged in the front, and the N acknowledgement/paging information fields are arranged after the M null acknowledgement/paging information fields.

12. The method according to claim 1, wherein the null acknowledgement/paging information field comprises a user identification field and a resource filed, the user identification field is used for indicating an identification of a user, and the resource field is used for representing a resource used by the instructed user to transmit uplink data or perform uplink retransmission; and the null acknowledgement/paging information field does not comprise an acknowledgement information bitmap;
wherein the null acknowledgement/paging information field further comprises uplink transmission parameter information to be modulated for indicating uplink transmission;
uplink transmission parameters comprise: transmission power control and/or a frequency offset pre-correction and/or a time delay parameter and/or a frequency domain for uplink transmission/a parameter of a space domain resource range.

13. The method according to claim 1, wherein the null acknowledgement/paging information field does not comprise an acknowledgement information bitmap and acknowledgement information sequence control information.

14. The method according to claim 1, wherein the frame header further comprises a duration field for determining a length of an uplink multiuser radio frame of a user, who is instructed to be still capable of transmitting uplink data, in next uplink multiuser data transmission.

15. A non-transitory computer-readable storage medium, storing computer-executable instructions, when the instructions are executed, to perform the method of claim 1.

16. A primary node, comprising hardware performing instructions stored in a non-transitory computer readable medium which executes steps in following modules: an acquisition module and a control module, wherein
the acquisition module is arranged to acquire a transmission opportunity or a service period; and the control module is arranged to utilize a control/management frame carrying uplink multiuser control information, and instruct a secondary node to perform uplink multiuser data transmission in the transmission opportunity or the service period; wherein the control/management frame comprises a frame header and a frame body; wherein the frame header comprises: a transmission address field, a receiving address field and a frame control field, wherein the transmission address field is used for indicating address information of a device for transmitting a feedback frame, the receiving address field is used for indicating destination information of receiving the feedback frame and the frame control field is used for indicating that the frame where the frame control field is located is a feedback frame carrying multiple pieces of user data acknowledgement/paging information; and the frame body comprises: an acknowledgement/paging control field and M null acknowledgement/paging information fields and N acknowledgement/paging information fields, wherein each acknowledgement/paging information field or null acknowledgement/paging information field corresponds to one user of the uplink multiuser data transmission, and an expression "M+N" represents a total number of users;

wherein the null acknowledgement/paging information field is used for instructing uplink multiuser to transmit uplink data at the beginning of a transmission period or first scheduling one or more users to perform the uplink multiuser data transmission during multi-frame transmission or instructing a user to perform uplink retransmission.

17. The primary node according to claim 16, wherein the acquisition module is further arranged to receive uplink parallel multiuser data; and the control module is further arranged to utilize a control/management frame carrying multiple pieces of user data acknowledgement/paging information to acknowledge the received uplink parallel multiuser data, and utilize the control/management frame carrying the uplink multiuser control information to first schedule one or more users to perform the uplink multiuser data transmission during multi-frame transmission.

18. The primary node according to claim 16, wherein the control module is further arranged to utilize the control/management frame carrying the uplink multiuser control information to instruct users to perform uplink retransmission.

* * * * *